US009903702B2

(12) United States Patent
Verschut et al.

(10) Patent No.: US 9,903,702 B2
(45) Date of Patent: Feb. 27, 2018

(54) BODY DEFORMATION SENSOR AND USE OF SUCH A BODY DEFORMATION SENSOR

(71) Applicant: KISTLER HOLDING AG, Winterthur (CH)

(72) Inventors: Roderick Verschut, Speyer (DE); Sascha Rundel, Beerfelden (DE); Thomas Warkentin, Heiligkreuzsteinach (DE)

(73) Assignee: KISTLER HOLDING AG, Winterthur (CH)

( * ) Notice: Subject to any disclaimer, the term of this patent is extended or adjusted under 35 U.S.C. 154(b) by 8 days.

(21) Appl. No.: 15/206,460

(22) Filed: Jul. 11, 2016

(65) Prior Publication Data
US 2017/0016709 A1 Jan. 19, 2017

(30) Foreign Application Priority Data
Jul. 15, 2015 (EP) .................................... 15176921

(51) Int. Cl.
*G01B 7/16* (2006.01)
*G01B 21/32* (2006.01)
*G01M 17/007* (2006.01)
*G01B 7/02* (2006.01)
(Continued)

(52) U.S. Cl.
CPC ............... *G01B 7/18* (2013.01); *G01B 7/026* (2013.01); *G01B 7/30* (2013.01); *G01B 21/32* (2013.01); *G01L 5/0052* (2013.01); *G01M 17/0078* (2013.01)

(58) Field of Classification Search
CPC . G01B 7/18; G01B 7/026; G01B 7/30; G01B 5/30; G01B 21/32; G01B 7/16; G01L 5/0052; G01L 3/24; G01M 17/0078
USPC ......... 73/767, 763, 771, 781, 855, 760, 862, 73/769
See application file for complete search history.

(56) References Cited

U.S. PATENT DOCUMENTS

| 5,317,931 | A | * | 6/1994 | Kalami | .................... | G01B 5/30 33/760 |
| 5,430,953 | A | * | 7/1995 | de Souza | .................. | G01B 5/30 33/1 PT |

(Continued)

FOREIGN PATENT DOCUMENTS

| CN | 101826270 A | 9/2010 |
| DE | 88 01 109 U1 | 6/1988 |

(Continued)

OTHER PUBLICATIONS

EP Search Report (16177793.3), dated Dec. 1, 2016.
EP Search Report, dated Jan. 22, 2016.

*Primary Examiner* — Harshad R Patel
*Assistant Examiner* — Nigel Plumb
(74) *Attorney, Agent, or Firm* — Dority & Manning, P.A.

(57) ABSTRACT

A body deformation sensor includes a telescopic arm that is collapsible along a longitudinal axis. The telescopic arm includes a length sensor for detecting a length of the telescopic arm. The telescopic arm also includes at least one angle sensor for detecting a rotation of the telescopic arm around an axis that is perpendicular to the longitudinal axis. The detection of the length of the telescopic arm and the detection of a rotation of the telescopic arm are performed with a temporal resolution of at least 10 kHz.

15 Claims, 4 Drawing Sheets

(51) Int. Cl.
   *G01B 7/30*   (2006.01)
   *G01L 5/00*   (2006.01)

(56)           References Cited

U.S. PATENT DOCUMENTS 5,772,610 A  *  6/1998  McGorry ............. A61B 5/1071
                                                        33/512
   2003/0216665 A1*  11/2003  Masuo ................. A61B 5/0537
                                                        600/547
   2005/0206910 A1*  9/2005  Schroeder ............. G01B 7/001
                                                        356/614
   2008/0221485 A1*  9/2008  Lissek .................... A61B 5/103
                                                        600/595
   2011/0067253 A1*  3/2011  Happel .................. A61B 5/103
                                                        33/512

FOREIGN PATENT DOCUMENTS

DE    10 2004 055234 A1    5/2005
   FR        2 521 718 A1     8/1983
   WO    WO 2010/133552 A1   11/2010
   WO    WO 2015/066713 A1    5/2015
   WO    WO 2015066713    *   7/2015  .............. G01B 5/30

* cited by examiner

BODY DEFORMATION SENSOR AND USE OF SUCH A BODY DEFORMATION SENSOR

FIELD OF THE INVENTION

The invention relates to a body deformation sensor having a telescopic arm and to a use of such a body deformation sensor.

BACKGROUND

A body deformation sensor having a telescopic arm is employed in accident research in automobiles in crash test dummies (anthropomorphic test devices or ATD). The body deformation sensor senses body deformations of the crash test dummy with a temporal resolution of 0.05 msec and less. Thus, in a crash test an automobile frontally collides with an obstacle with a specific velocity. At least one crash test dummy is placed in the automobile. In the frontal impact, the crash test dummy is temporarily subjected to a high acceleration and the body of the crash test dummy is deformed. Regionally, the crash test is regulated by the Euro New Car Assessment Program (Euro NCAP) or the US New Car Assessment Program (US NCAP), for example. According to these regulations, the body acceleration of the crash test dummy has to comply with certain limit values. Thus, according to Euro NCAP or US NCAP the limit value for chest acceleration of the crash test dummy is 60 g for a period of time of at least 3 msec.

The document US20050206910A1, which is herein incorporated herein by this reference for all purposes, discloses such a body deformation sensor having a telescopic arm that extends along a longitudinal axis from a first end to a second end. The telescopic arm is reversibly slidably collapsible along the longitudinal axis, thereby changing its length. A light source is arranged within the telescopic arm at the first end, while a light receiver is arranged at the second end. The light receiver detects a luminance of light emitted from the light source. The luminance detected varies with the length of the telescopic arm.

The body deformation sensor can be mounted in the chest of a crash test dummy. Thus, document US20050206910A1 shows how the telescopic arm is arranged with its longitudinal axis parallel to a horizontal axis of the crash test dummy. Upon deformation of the chest along its horizontal axis, the telescopic arm slidingly collapses, thereby changing its length. The light receiver detects the change in length as a change in luminance. The change in luminance is a clear output signal indicating deformation of the chest along the longitudinal axis.

It is an object of the present invention to improve a body deformation sensor having a telescopic arm.

SUMMARY OF THE INVENTION

The invention relates to a body deformation sensor having a telescopic arm that is slidably collapsible along a longitudinal axis. As embodied herein, the body deformation sensor includes in addition to a length sensor for the detection of a length of the telescopic arm, two angle sensors. One angle sensor detects a rotation of the telescopic arm around a first axis that is perpendicular to the longitudinal axis, and the second angle sensor detects a rotation of the telescopic arm around a second axis that is perpendicular to the longitudinal axis and perpendicular to the first axis. Moreover, each of the length sensor and each of the two angle sensors generates an analog signal having a temporal resolution of at least 10 kHz.

In contrast to the prior art according to document US20050206910A1, the body deformation sensor according to the invention not only detects a change in the length of the telescopic arm along its longitudinal axis but additionally senses at least one rotation of the telescopic arm around an axis that is perpendicular to the longitudinal axis. This improves the accuracy by which the body deformations are detected. It has been found that a deformation of a body generally not only occurs along a longitudinal axis but also has components that run along axes that are perpendicular to the longitudinal axis. In addition, the detection of the length of the telescopic arm and of the rotation of the telescopic arm are performed with a temporal resolution of at least 10 kHz.

The invention also relates to an anthropomorphic test device that includes a crash dummy outfitted with such a body deformation sensor.

BRIEF DESCRIPTION OF THE DRAWINGS

In the following, the invention will be explained in more detail by way of example of a preferred embodiment thereof referring to the figures in which.

DESCRIPTION OF EXEMPLARY EMBODIMENTS OF THE INVENTION

Figure 1:
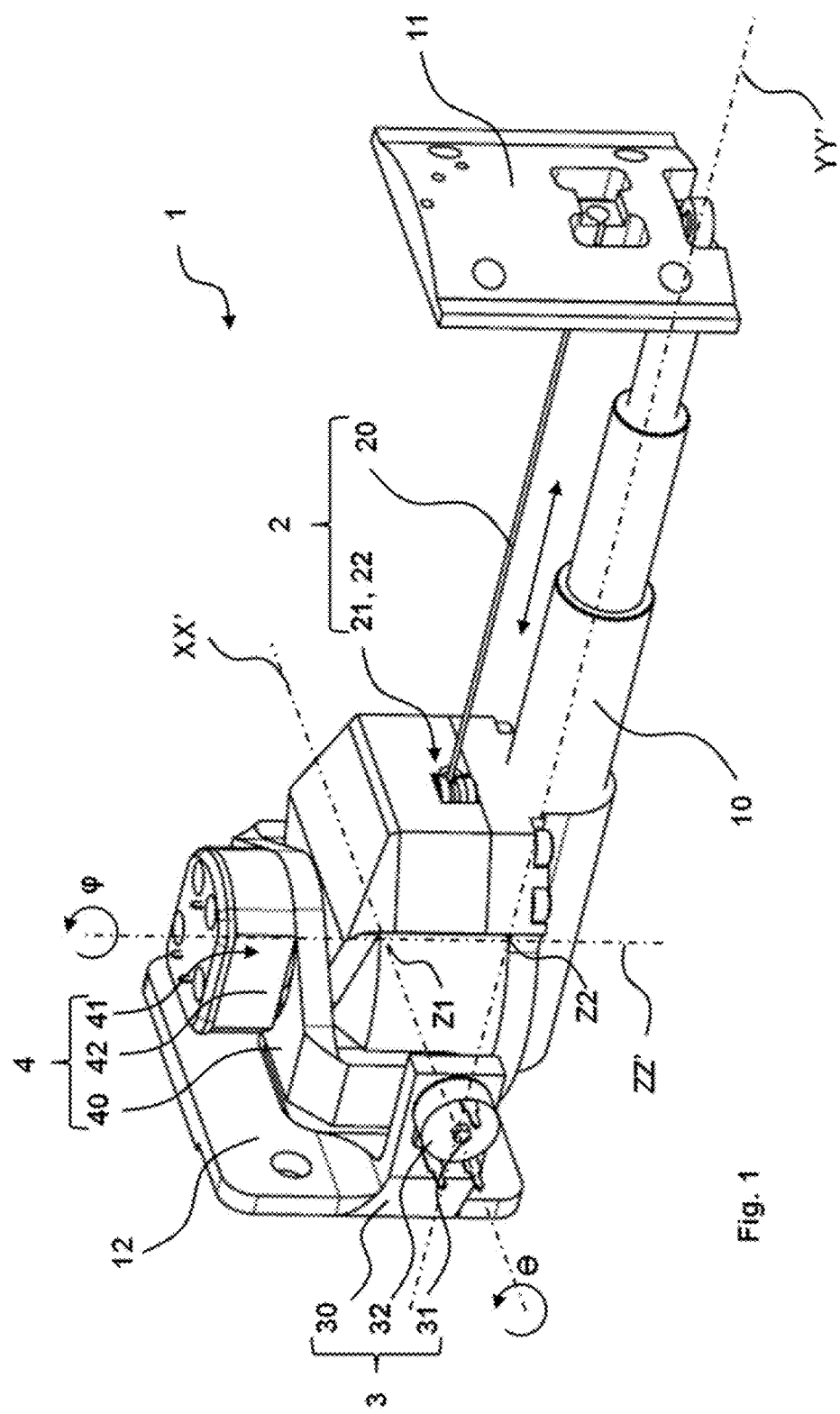
FIG. 1 shows a perspective view of an embodiment of the body deformation sensor in accordance with the present invention.

As shown in FIG. 1, an exemplary embodiment of a body deformation sensor in accordance with the present invention is designated generally by the numeral 1 and is arranged in a Cartesian coordinate system having the coordinate axes XX', YY' and ZZ'. The coordinate axes XX', YY' ZZ' are perpendicular to each other. The coordinate axis YY' and the longitudinal axis of YY' of a telescopic arm 10 are identical. The adjectives "front", "rear", "lower" and "upper" are relative to two centers Z1 and Z2 shown in FIGS. 1 to 3. The two centers Z1 and Z2 desirably are spaced apart from each other by 45 mm on coordinate axis ZZ'.

The body deformation sensor 1 includes a telescopic arm 10, a front fastening element 11 and a rear fastening element 12. These components of the body deformation sensor 1 are made from mechanically resistant materials such as metal, thermoplastic, thermoplastic elastomers, etc. The front fastening element 11 is arranged at a front end of the body deformation sensor 1. The rear fastening element 12 is arranged at a rear end of the body deformation sensor 1. The fastening elements 11, 12 enable a mechanical connection of the body deformation sensor 1 to a body like a crash test dummy, etc. The mechanical connection can be achieved by such joining techniques as form closure, force closure or material bonding. By form closure is meant positive fit joints such as by bolted joints or snap joints that are intended to be reversible without damaging either of the joined elements. By force closure is meant a force fit joint between two elements in contact with each other that requires the application of force to at least one of the elements by a tool in order to effect the connection such as screwed joints or riveted joints or press-fit joints, and while these are in some sense reversible, there might be damage done by the actions required for separation of the two elements. Another type of force closure would be joints held together by magnetic force attraction, yet these could be separated without damaging either of the joined elements. Preferably the mechanical connection of fastening elements 11, 12 is achieved via force closure by means of detachable screw connections that could be separated without damaging either of the joined elements. By material bonding is meant connection effected by soldering or welding for example.

The telescopic arm 10 is disposed between the front fastening element 11 and the rear fastening element 12. The telescopic arm 10 has several cylindrical elements. The elements are arranged in series and lengthen along a longitudinal axis YY'. An outer diameter of the elements becomes smaller towards the front fastening element 11 from each element to the next. Adjacent elements are slideable into one another and are fitted into each other. Along the longitudinal axis YY', the telescopic arm 10 is reversibly slidably collapsible and extendable whereby it changes its length Y. Advantageously, the length Y is changeable by 100 mm. A front end of the telescopic arm 10 is mechanically connected to the front fastening element 11. This mechanical connection can be achieved by means of form closure, force closure or material bonding. Preferably, the mechanical connection is achieved by means of force closure using detachable screw connections.

As shown in FIG. 1 for example, the body deformation sensor 1 includes a length sensor 2 and at least one angle sensor 3, 4.

In the exemplary embodiment, the length sensor 2 includes a rope 20, a rope drum 21 and a length sensor element 22. The rope 20 is stretched with one rope length parallel to the longitudinal axis YY'. A front end of the rope 20 is mechanically connected to the front fastening element 11, and a rear end of the rope 20 is mechanically connected to an interior of the rope drum 21. These mechanical connections are made by means of form closure, force closure or material bonding. The rope 20 is wound onto the rope drum 21 in the inside thereof. The rope 20 can be wound onto the rope drum 21 and can be unwound from the rope drum 21. The rope drum 21 has a spring element, which automatically tightens the rope 20 by means of a spring force. The rope 20 is arranged along the coordinate axis YY'. A change in the length Y of the telescopic arm 10 is proportional to a change of the rope length 20. The length sensor element 22 can be a sensor that changes its electrical resistance, an inductive sensor, a capacitive sensor, an incremental sensor, etc. Preferably, the length sensor element 22 is a sensor changing its electrical resistance in the form of a potentiometer that is accurate to within 1% of the measured resistance and that updates its output no less frequently than once every 0.1 millisecond (at least 10,000 times per second) and desirably at least once every 0.05 millisecond (at least 20,000 times per second). A suitable potentiometer is commercially available as model 174-0321T from Firstmark Controls of Creedmoor, N.C. 27522. This potentiometer senses a change in rope length as a change in electrical resistance to an accuracy of within 1% of the measured resistance and provides for each rope length detected an analog output signal in the form of an electrical DC voltage that is updated with a temporal resolution of at least 20 kHz. Thus, in accordance with the present invention, a change in rope length is detected with a temporal resolution of at least 10 kHz, preferably with 20 kHz. This accuracy of detecting the rope length is better than that of the prior art according to document US20050206910A1. Furthermore, this potentiometer is adapted for a rope acceleration of 50 g where g is a gravitational acceleration of 9.81 m/sec2. This rope acceleration complies with the permissible limit value for a body acceleration which is for example 60 g according to Euro NCAP or US NCAP for the chest acceleration of the crash test dummy for a period of time of at least 3 msec.

Advantageously, the at least one angle sensor 3, 4 desirably includes a polar angle sensor 3 for a polar angle $\Theta$ and an azimuth angle sensor 4 for an azimuth angle $\phi$. The polar angle $\Theta$ indicates a rotation of telescopic arm 10 around coordinate axis XX'. The azimuth angle $\phi$ indicates a rotation of telescopic arm 10 around coordinate axis ZZ'. The polar angle sensor 3 desirably includes a polar angle bracket 30, which rotatably carries a polar angle shaft 31 and a polar angle sensor element 32, which is non-rotatably connected to and carried by the polar angle shaft 31. The azimuth angle sensor 4 desirably includes an azimuth angle bracket 40, which rotatably carries an azimuth angle shaft 41 and an azimuth angle sensor element 42, which is non-rotatably connected to and carried by the azimuth angle shaft 41. The polar angle bracket 30, the polar angle shaft 31, the azimuth angle bracket 40, and the azimuth angle shaft 41 are made from mechanically resistant material such as metal, thermoplastic, thermoplastic elastomers, etc.

The at least one angle sensor 3, 4 is mechanically connected to the rear fastening element 12. This mechanical connection desirably is achieved by form closure, force closure or material bonding. Preferably, the mechanical connection is made by force closure by means of detachable screw connections. A rear end of the telescopic arm 10 is mechanically connected to the at least one angle sensor 3, 4. This mechanical connection desirably is made via form closure, force closure or material bonding. Preferably, detachable screws mechanically connect by force closure the rear end of the telescopic arm 10 to the at least one angle sensor 3, 4.

The polar angle shaft 31 is mounted in the polar angle bracket 30 to be freely rotatable around coordinate axis XX'. Preferably, the polar angle bracket 30 is in the shape of a horseshoe having a curved rear and an open front area. Polar angle bracket 30 is largely mirror symmetrical with regard to an YZ-plane. The polar angle bracket 30, in its rear curved area, is mechanically connected to the rear fastening element 12. This mechanical connection desirably is achieved via form closure, force closure or material bonding. Preferably, the mechanical connection is achieved by force closure by means of detachable screw connections. The polar angle bracket 30 has two legs in its front open area. An opening is arranged in each leg. In each opening a polar angle shaft 31 is disposed. The openings and the polar angle shaft 31 are arranged along coordinate axis XX'. A front end of the polar angle shaft 31 and a rear end of the polar angle shaft 31 are mounted in the openings to be freely rotatable around coordinate axis XX'. The polar angle sensor element 32 is mechanically connected to the polar angle bracket 30 in a non-rotatable manner and is arranged at the polar angle shaft 31. This mechanical connection desirably is achieved via form closure, force closure or material bonding.

Preferably, the azimuth angle bracket 40 is in the shape of a horseshoe having a curved upper and an open lower area. The azimuth angle bracket 40 is largely mirror symmetrical with regard to the YZ-plane. The azimuth angle bracket 40 has two legs in the lower open area. An opening is arranged in each leg. The openings are disposed along coordinate axis XX'. The azimuth angle bracket 40 is mechanically connected to the polar angle shaft 31 via the openings. This mechanical connection is made by form closure, force closure or material bonding. Preferably, the mechanical connection is achieved by force closure by means of detachable screw connections.

The azimuth angle shaft 41 is mounted in the azimuth angle bracket 40 to be freely rotatable around coordinate axis ZZ'. In the upper open area, the azimuth angle bracket 40 has an opening. In the opening, the azimuth angle shaft 41 is arranged. The opening is arranged along coordinate axis ZZ'. An upper end of azimuth angle shaft 41 is mounted in the opening to be freely rotatable around coordinate axis ZZ'. The azimuth angle sensor element 42 is mechanically connected to the azimuth angle bracket 40 in a non-rotatable manner and is arranged at the azimuth angle shaft 41. This mechanical connection is made via form closure, force closure or material bonding.

Figure 2:
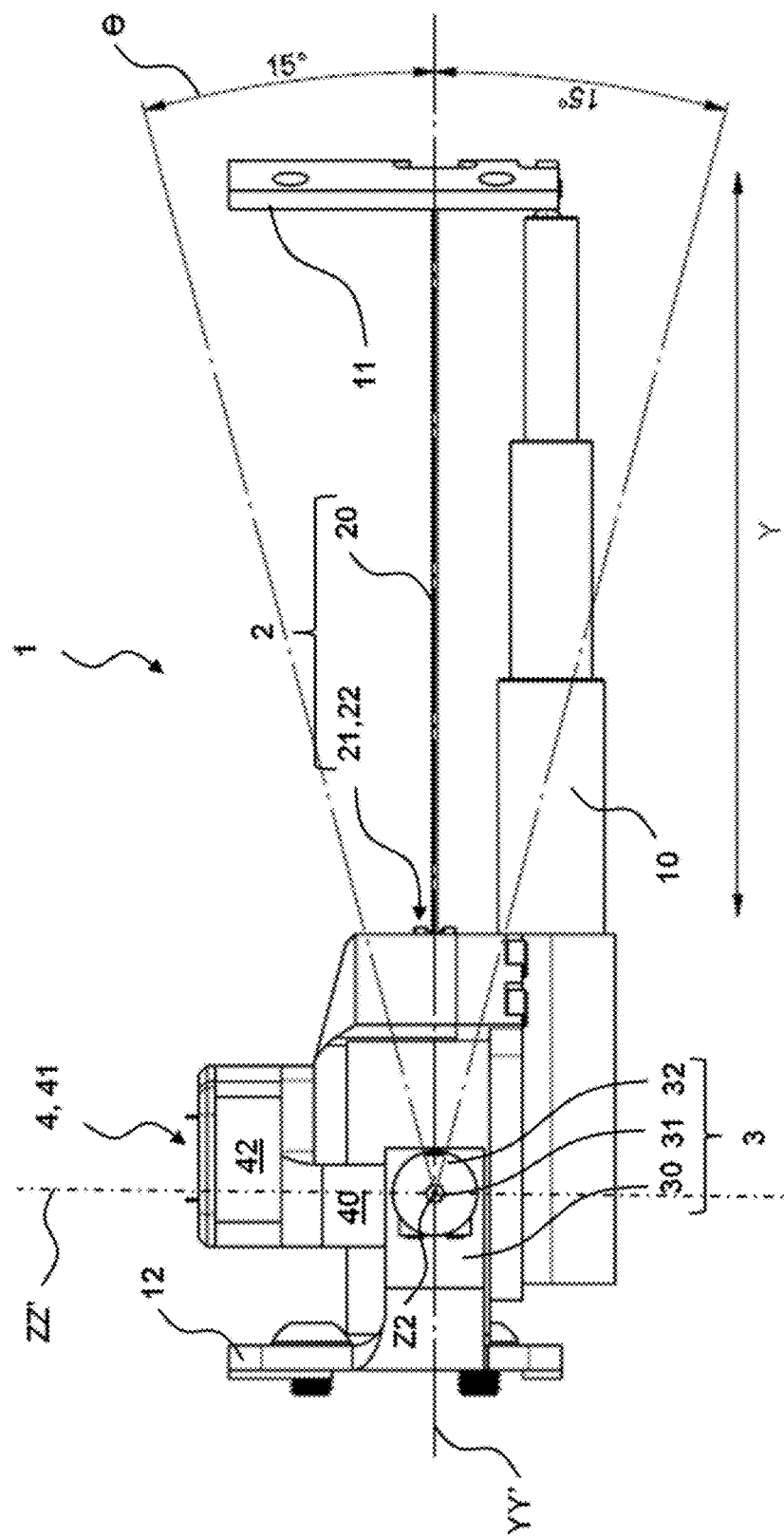
FIG. 2 depicts a side view of the embodiment of a body deformation sensor according to FIG. 1.
Figure 3:
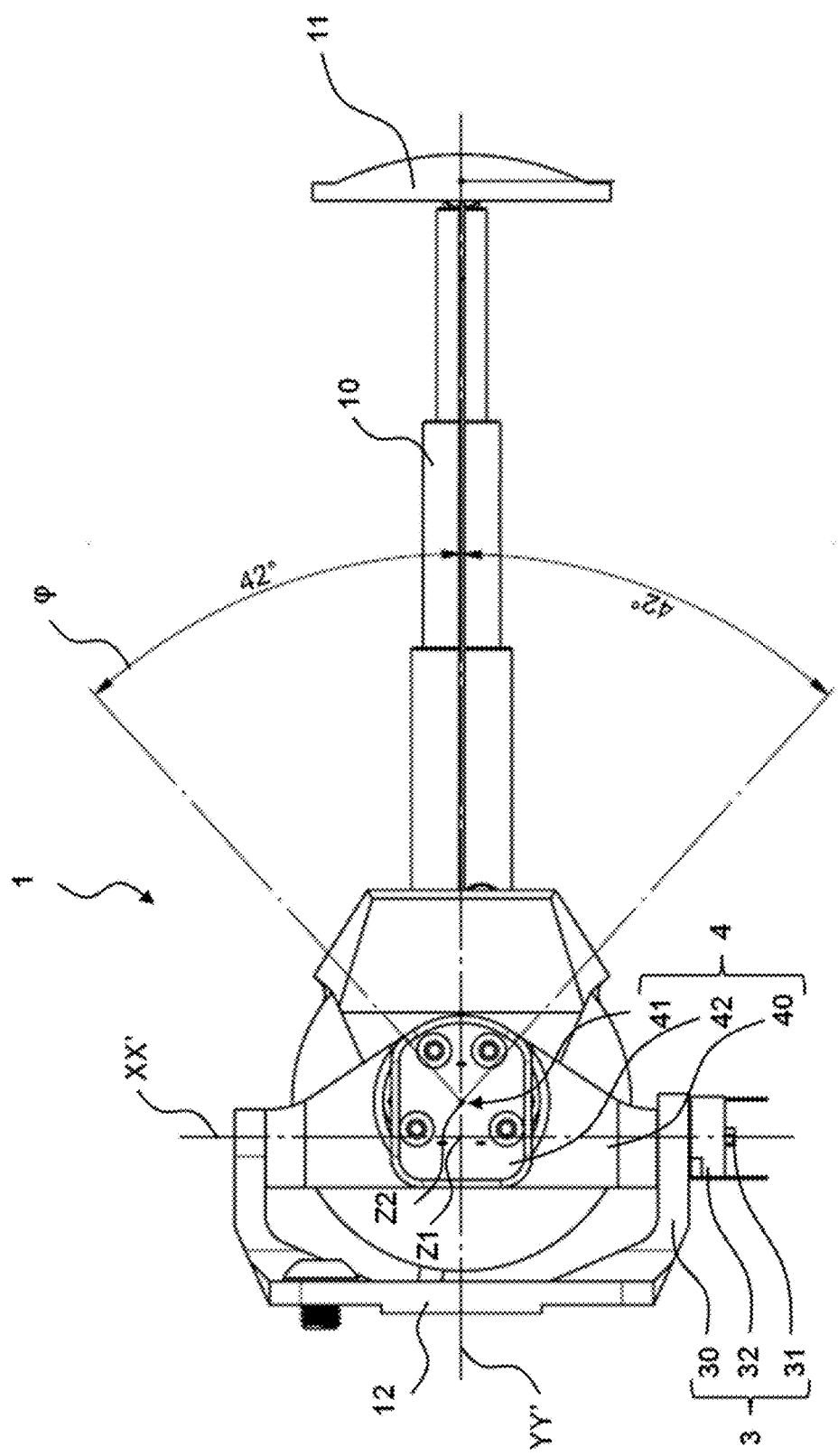
FIG. 3 depicts a top view of the embodiment of a body deformation sensor according to FIGS. 1 and 2.

Each of the polar angle sensor element 32 and the azimuth angle sensor element 42 is a sensor changing its electrical resistance, an inductive sensor, a capacitive sensor, an incremental sensor, etc. Preferably, each of the polar angle and the azimuth angle elements 32 and 42 is a sensor changing its electrical resistance in the form of a potentiometer as it is commercially available as model PT-10 by Piher Sensors & Controls S.A. of Brighton, Mich. This potentiometer captures each angle (polar angle $\Theta$ and azimuth angle $\phi$) through a wiper. For this purpose, each shaft (polar angle shaft 31 and azimuth angle shaft 41) is mechanically connected to the wiper. This mechanical connection is formed via form closure, force closure or material bonding. In this way, a rotational movement of the shaft is directly transmitted to the wiper, and depending on the position of the wiper the electrical resistance of the sensor changes. Thus, a rotation of telescopic arm 10 around a coordinate axis XX', ZZ' is proportional to a change in the electrical resistance. This potentiometer captures an angle with an accuracy of about 3% and provides an analog output signal in the form of an electrical DC voltage for each angle captured. The analog output signal is detected with a temporal resolution of at least 10 kHz, preferably with 20 kHz. As shown in FIG. 2, the polar angle $\Theta$ is captured over a range of +/−15°. As shown in FIG. 3, the azimuth angle $\phi$ is captured over a range of +/−42°.

The output signals of the length sensor element 22, the polar angle sensor element 32 and the azimuth angle sensor element 42 are collected in an evaluation unit. The collected output signals are digitized and stored in a central memory. The data are transferred via a system cable. This system cable also provides electrical power supply for the length sensor element 22, the polar angle sensor element 32 and the azimuth angle sensor element 42

With its rear end, the telescopic arm 10 is mechanically connected to the azimuth angle shaft 41 in a non-rotatable manner. This mechanical connection is made via form closure, force closure or material bonding. Preferably, the mechanical connection is achieved by force closure by means of detachable screw connections.

Figure 4:
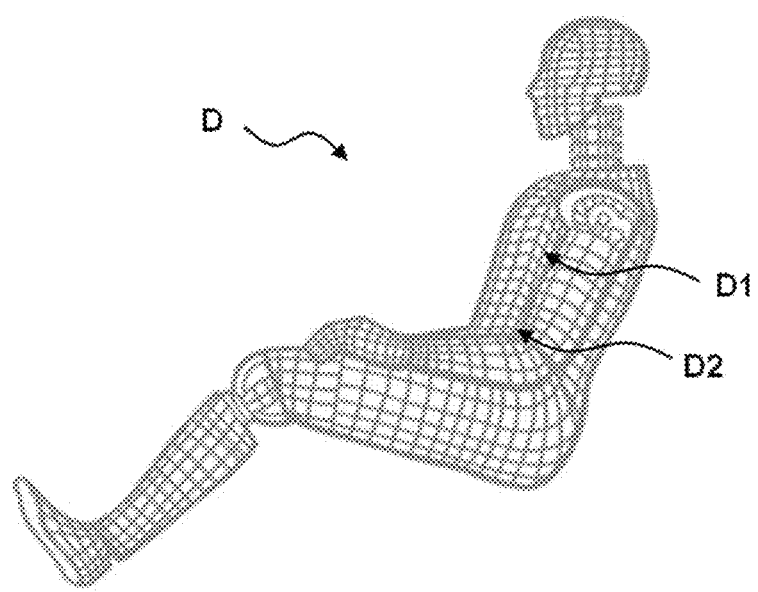
FIG. 4 depicts a schematic view of an anthropomorphic test device that includes a crash test dummy outfitted with body deformation sensors according to FIGS. 1 to 3.

FIG. 4 shows a use of the body deformation sensor 1 in a crash test dummy D. Thus, the body deformation sensor 1 can be mounted in a chest D1 of a crash test dummy by means of the front fastening element 11 and the rear fastening element 12. In addition, the body deformation sensor 1 can be mounted in an abdomen D2 of a crash test dummy by means of the front fastening element 11 and the rear fastening element 12. Knowing the present invention, the body deformation sensor 1 can also be mounted in any other body such as in automobiles, railway vehicles, trolleys, aircrafts, etc., for the measurement of body deformations.

LIST OF REFERENCE NUMERALS 1 body deformation sensor
2 length sensor
3 angle sensor for a polar angle
4 angle sensor for an azimuth angle
10 telescopic arm
11 front fastening element
12 rear fastening element
20 rope
21 rope drum
22 length sensor element
30 polar angle bracket
31 polar angle shaft
32 polar angle sensor element
40 azimuth angle bracket
41 azimuth angle shaft
42 azimuth angle sensor element
D crash test dummy
D1 chest
D2 abdomen
XX' coordinate axis
YY' coordinate axis
ZZ' coordinate axis
Y length
YZ plane
Z1 first center
Z2 second center
$\Theta$ polar angle
$\phi$ azimuth angle

What is claimed is:

1. A body deformation sensor comprising:
a telescopic arm that is slidably collapsible along a longitudinal axis;
a length sensor for detecting a length of the telescopic arm with a temporal resolution of at least 10 kHz;
at least one angle sensor for detecting a rotation of the telescopic arm around at least one axis that is perpendicular to said longitudinal axis; and
wherein the detection of the rotation of the telescopic arm is performed by the at least one angle sensor with a temporal resolution of at least 10 kHz.

2. The body deformation sensor according to claim 1, wherein said length sensor includes a length of rope that is stretched with a rope length parallel to the longitudinal axis; and
wherein a change in the length of the telescopic arm is proportional to a change of the rope length of the rope.

3. The body deformation sensor according to claim 2, further comprising:
a front fastening element that is mechanically connected to a front end of the telescopic arm;
a front end of the rope is mechanically connected to the front fastening element;
the length sensor includes a rope drum;
a rear end of the rope is mechanically connected to an interior of the rope drum; and
wherein a rope acceleration complies with the permissible limit value for the acceleration of a body.

4. The body deformation sensor according to claim 3, wherein the length sensor includes a length sensor element;

wherein the length sensor element is a sensor changing its electrical resistance in the form of a potentiometer and wherein said potentiometer captures a change in the rope length as a change of an electrical resistance.

5. The body deformation sensor according to claim 1, wherein the at least one angle sensor includes a polar angle sensor for a polar angle wherein said polar angle indicates a rotation of the telescopic arm around a first coordinate axis that is perpendicular to the longitudinal axis; and wherein the at least one angle sensor includes an azimuth angle sensor for an azimuth angle wherein said azimuth angle indicates a rotation of the telescopic arm around a second coordinate axis that is perpendicular to the longitudinal axis and perpendicular to the first coordinate axis.

6. The body deformation sensor according to claim 5, wherein the polar angle sensor includes a polar angle bracket, a polar angle shaft carried by the bracket, and a polar angle sensor element carried by the shaft.

7. The body deformation sensor according to claim 6, wherein the polar angle shaft is mounted in the polar angle bracket to be freely rotatable around the first coordinate axis; and wherein the polar angle sensor element is mechanically connected to the polar angle shaft in a non-rotatable manner and is arranged at the polar angle bracket.

8. The body deformation sensor according to claim 5, wherein the azimuth angle sensor includes an azimuth angle bracket, an azimuth angle shaft carried by the azimuth angle bracket, and an azimuth angle sensor element carried by the azimuth angle shaft.

9. The body deformation sensor according to claim 8, wherein the azimuth angle shaft is mounted in the azimuth angle bracket to be freely rotatable around the second coordinate axis; and wherein the azimuth angle sensor element is mechanically connected to the azimuth angle bracket in a non-rotatable manner and is arranged at the azimuth angle shaft.

10. The body deformation sensor according to claim 5, wherein the at least one angle sensor is a sensor changing its electrical resistance in the form of a potentiometer, which potentiometer detects a rotation of the telescopic arm around a coordinate axis as a change in the electrical resistance.

11. The body deformation sensor according to claim 5, wherein the body deformation sensor includes a rear fastening element mechanically connected to the at least one angle sensor; and wherein a rear end of the telescopic arm is mechanically connected to the at least one angle sensor.

12. The body deformation sensor according to claim 11, wherein the polar angle sensor includes a polar angle bracket, a polar angle shaft carried by the bracket, and a polar angle sensor element carried by the shaft;

wherein the polar angle bracket is mechanically connected to the rear fastening element;

the polar angle shaft is mounted in the polar angle bracket to be freely rotatable around the first coordinate axis;

the azimuth angle shaft is mechanically connected to the polar angle shaft in a non-rotatable manner;

the azimuth angle shaft is mounted in the azimuth angle bracket to be freely rotatable around the second coordinate axis; and wherein a rear end of the telescopic arm is mechanically connected to the azimuth angle shaft in a non-rotatable manner.

13. An anthropomorphic test device, comprising:

a crash test dummy; and a body deformation sensor according to claim 1, wherein the body deformation sensor is mounted in the crash test dummy.

14. The anthropomorphic test device according to claim 13, wherein the body deformation sensor is fitted into a chest of the crash test dummy by front and rear fastening elements.

15. The anthropomorphic test device according to claim 13, wherein the body deformation sensor is fitted in an abdomen of the crash test dummy by front and rear fastening elements.

* * * * *